(No Model.) 6 Sheets—Sheet 1.
J. T. RUSSELL & J. D. WILLIAMS.
HAY PRESS.
No. 484,757. Patented Oct. 18, 1892.
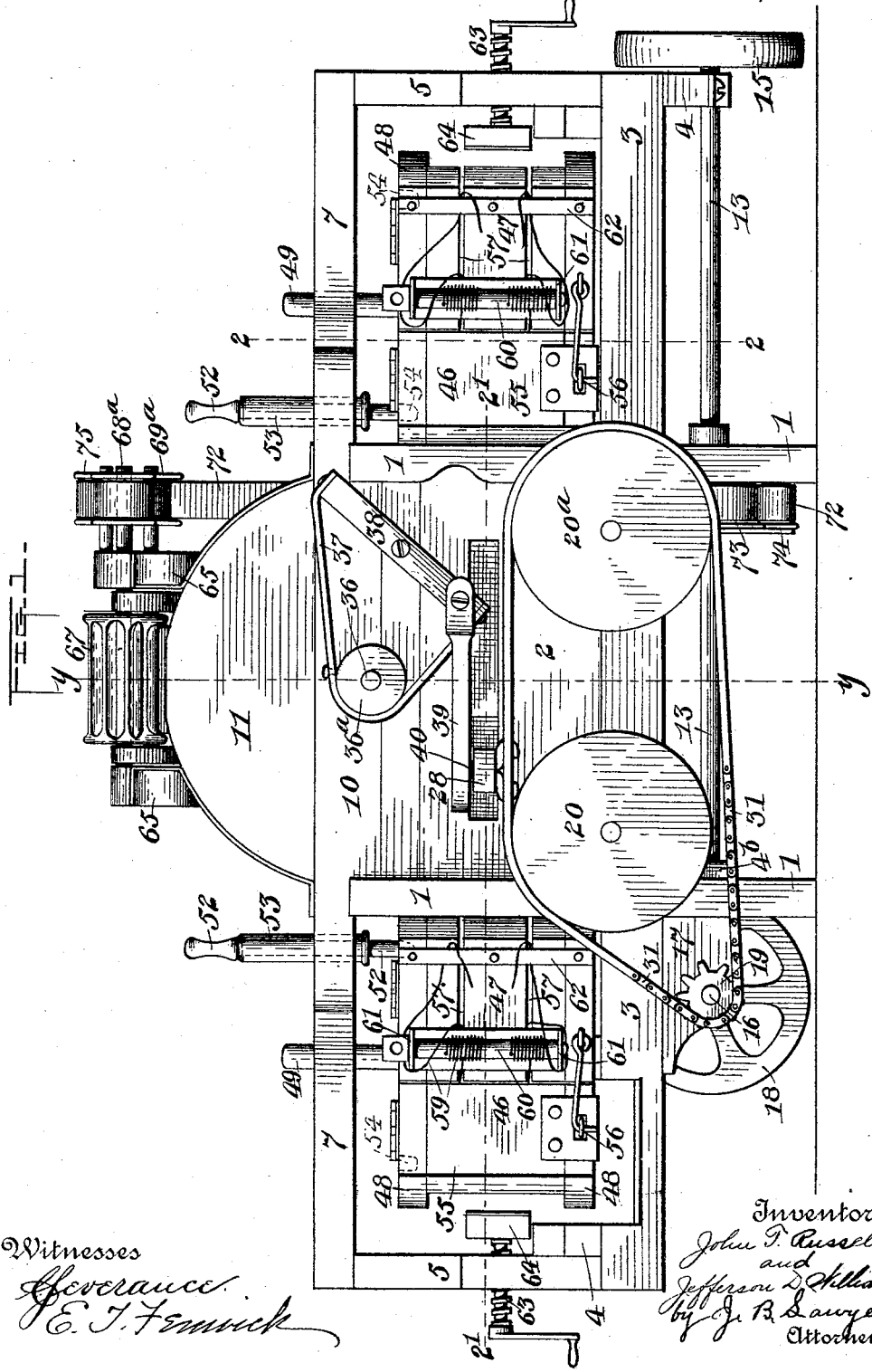
Witnesses
Severance
E. J. Fenwick
Inventors
John T. Russell
and
Jefferson D. Williams
by J. B. Sawyer
Attorney

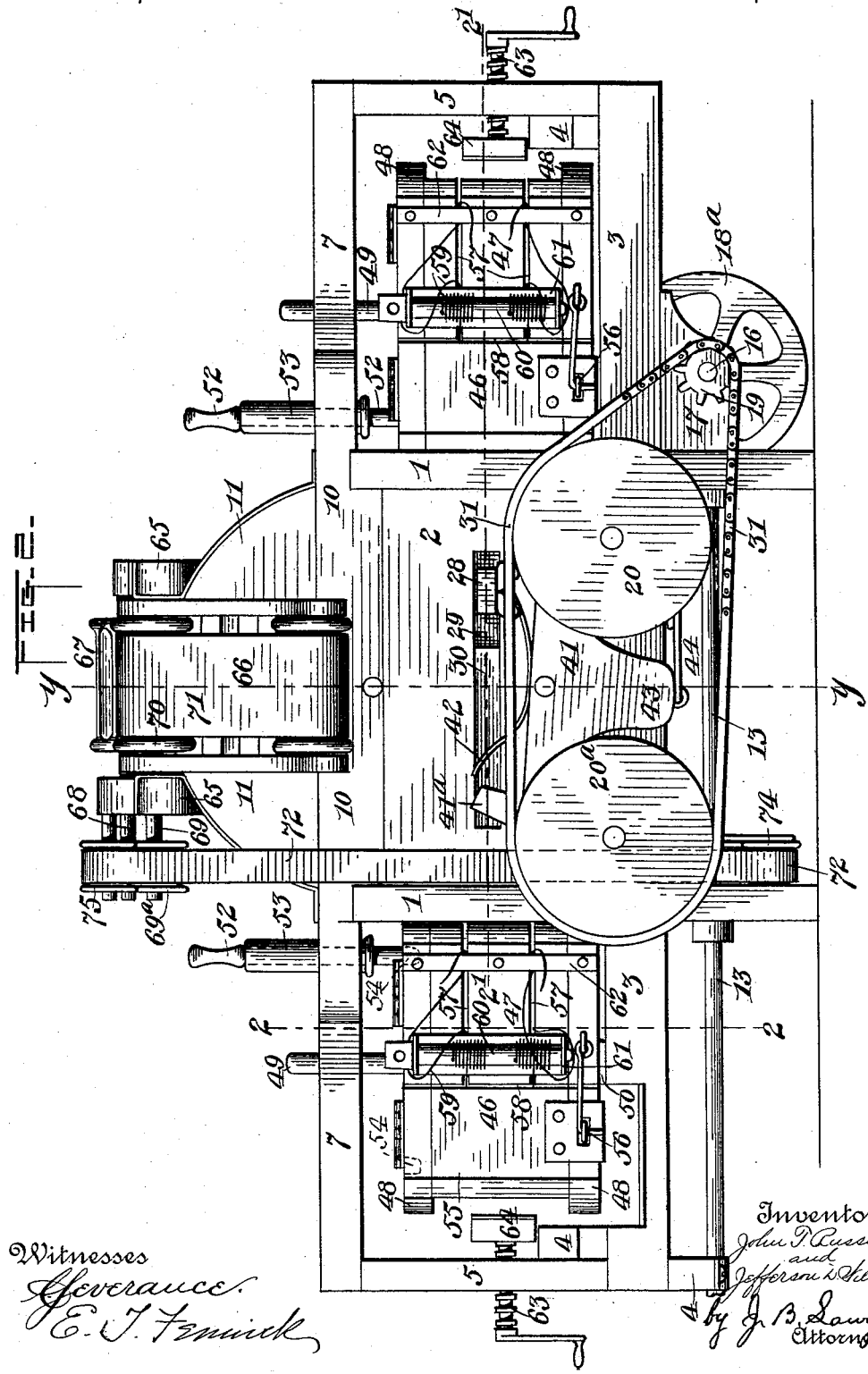

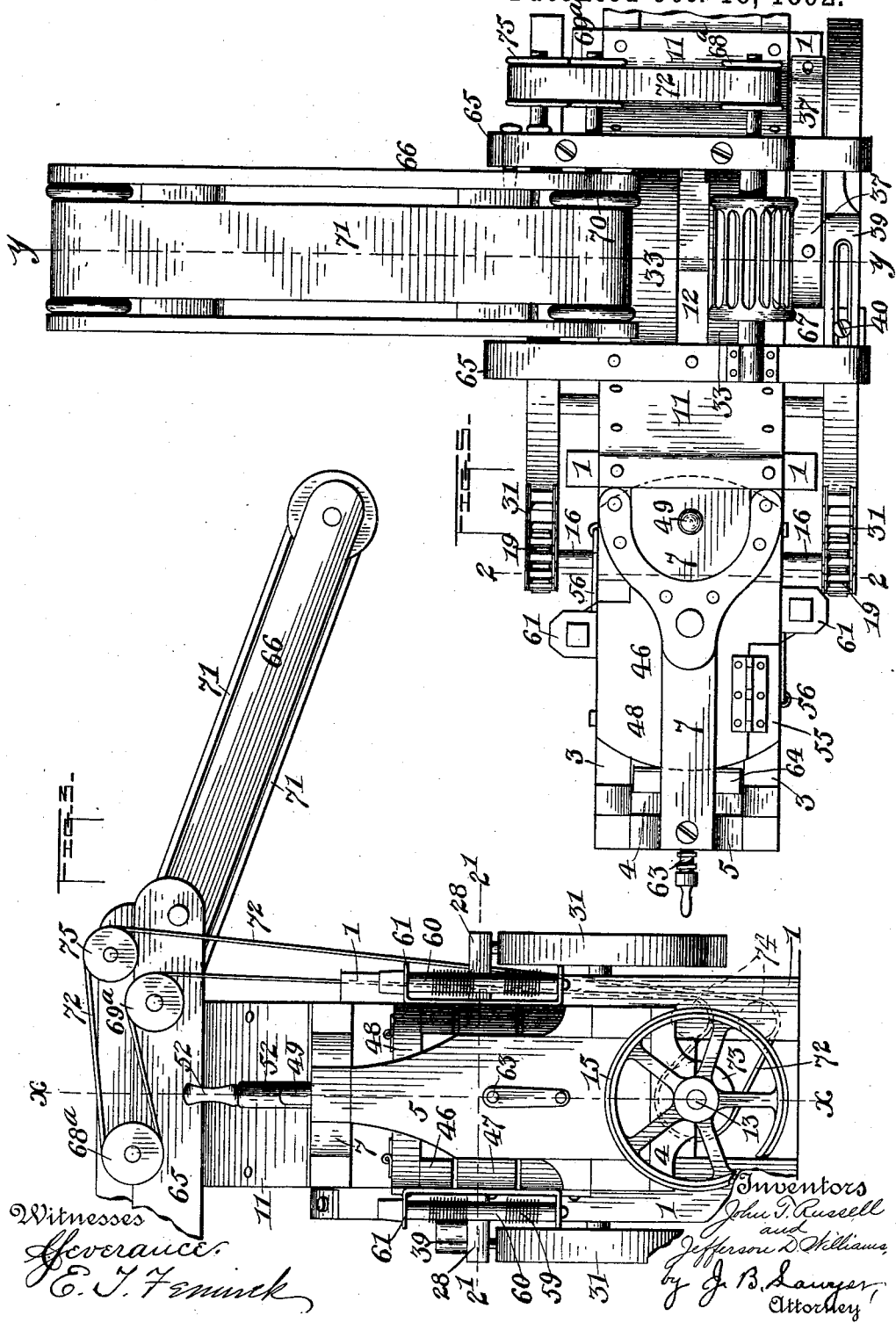

(No Model.) 6 Sheets—Sheet 4.
J. T. RUSSELL & J. D. WILLIAMS.
HAY PRESS.
No. 484,757. Patented Oct. 18, 1892.
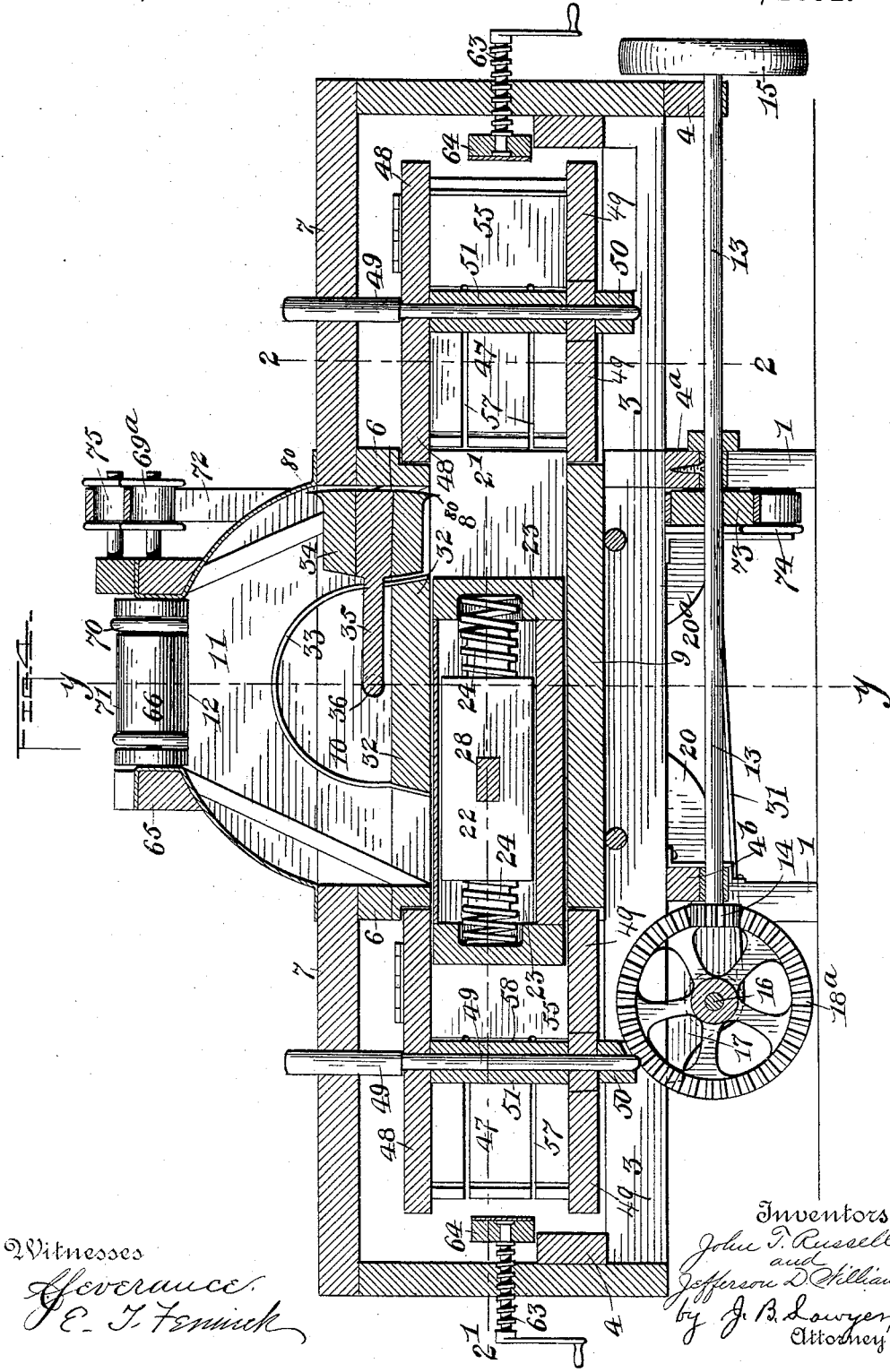
Witnesses
Severance
E. T. Fenwick
Inventors
John T. Russell
and
Jefferson D. Williams
by J. B. Lawyer
Attorney

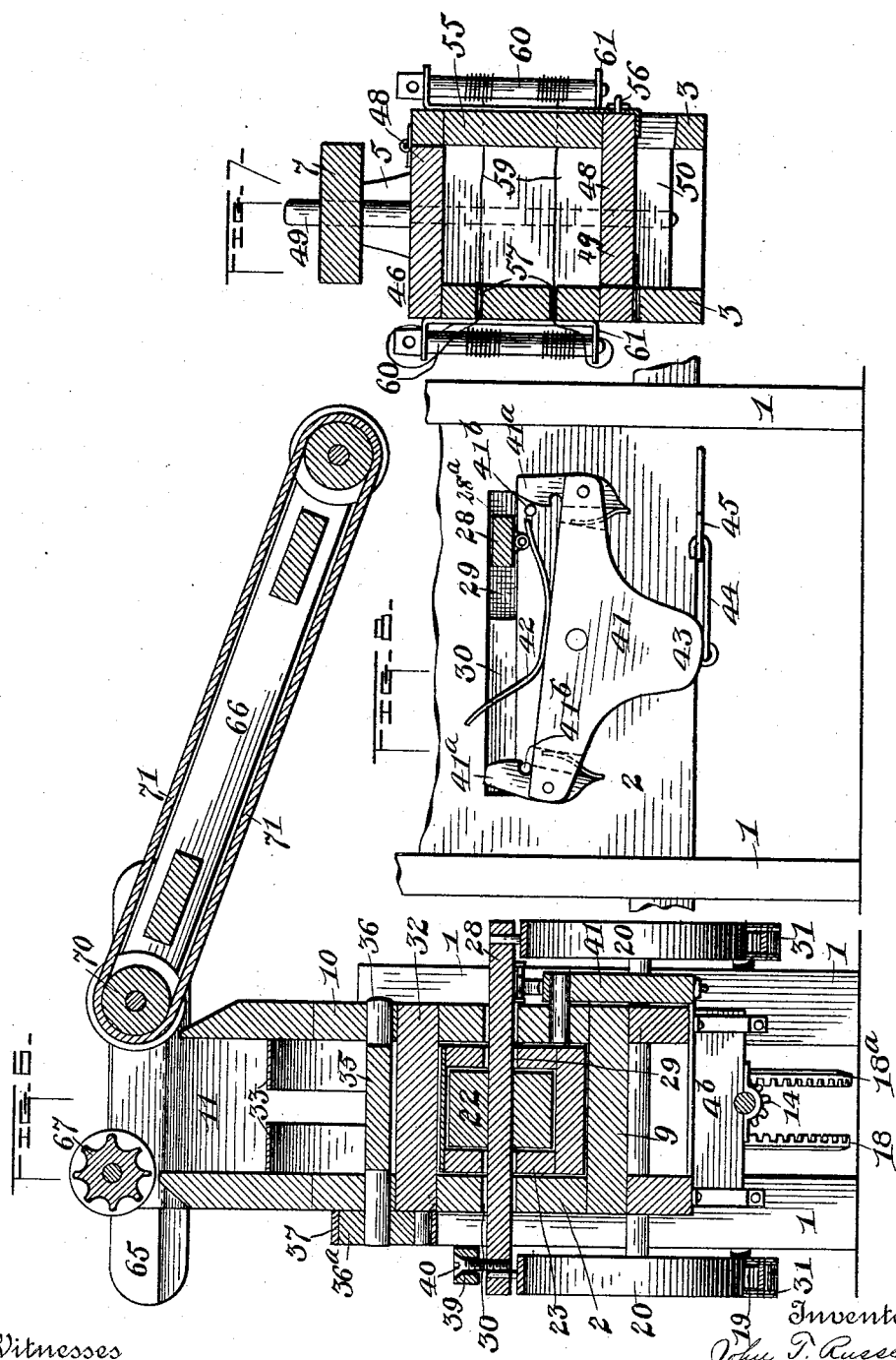

(No Model.) 6 Sheets—Sheet 6.
J. T. RUSSELL & J. D. WILLIAMS.
HAY PRESS.
No. 484,757. Patented Oct. 18, 1892.
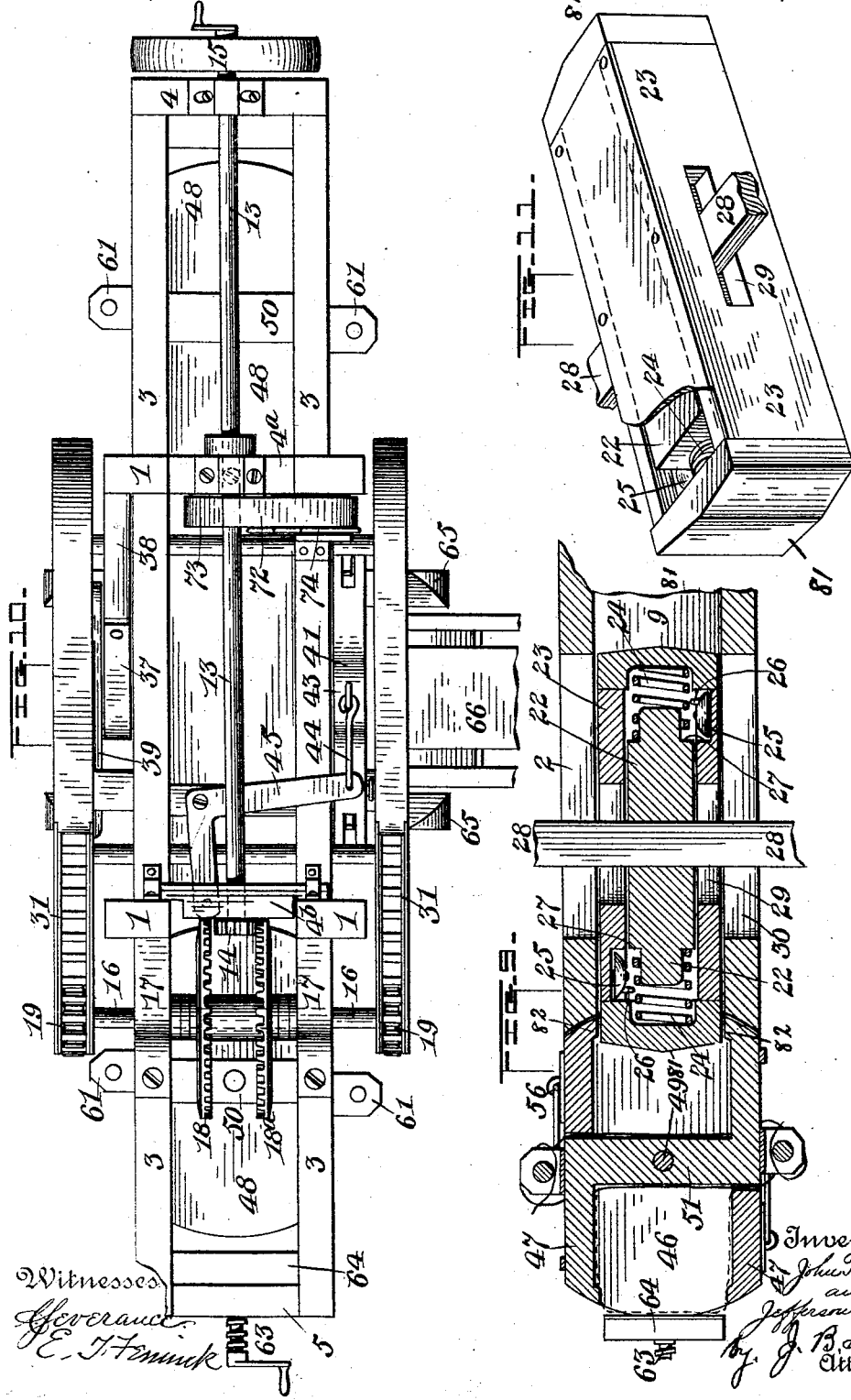

UNITED STATES PATENT OFFICE.

JOHN THOMAS RUSSELL AND JEFFERSON DAVIS WILLIAMS, OF ROGERS, ARKANSAS.

HAY-PRESS.

SPECIFICATION forming part of Letters Patent No. 484,757, dated October 18, 1892.

Application filed February 13, 1892. Serial No. 421,422. (No model.)

*To all whom it may concern:*

Be it known that we, JOHN THOMAS RUSSELL and JEFFERSON DAVIS WILLIAMS, citizens of the United States, residing at Rogers, in the county of Benton and State of Arkansas, have invented certain new and useful Improvements in Hay-Presses and Cotton-Presses; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention has for its object to provide a new construction in presses, whereby two bundles of any proper fibrous substance—such as hay or cotton—may be simultaneously compressed; and for this purpose it consists in the construction, arrangement, and combination of the several parts of which it is composed, as will be hereinafter more fully described and claimed.

Referring to the accompanying drawings, in which corresponding parts are designated by corresponding numerals, Figures 1 and 2 are side elevations, from opposite sides of our improved press. Fig. 3 is an end view thereof. Fig. 4 is a longitudinal vertical section on line $x$ $x$ of Fig. 3. Fig. 5 is a plan view. Fig. 6 is a transverse vertical section on line $y$ $y$ of Figs. 1, 2, 4, and 5. Fig. 7 is a transverse vertical section on line $z$ $z$ of Figs. 1, 2, 4, and 5. Fig. 8 is a detail view of the main tripping mechanism. Fig. 9 is a horizontal section through one of the revoluble baling-boxes and the central plunger-case on the line $z'$ $z'$ of Figs. 1, 2, 3, and 4. Fig. 10 is an inverted plan view of the press. Fig. 11 is a detail view of the plunger and plunger-box mounted thereon.

A central structure is formed by the four upright posts 1 and the inclosing sides 2, which extend from each post to the remaining post on that side of the press, thus forming a casing, within which the plunger is contained. A longitudinal stringer 3 is supported by the posts 1 on each side of the press, at the level of the bottom of the sides 2, the ends of the said stringers projecting and being secured together by cross-pieces 4, one at each end, from each of which cross-pieces an end post 5 rises, each of the said end posts having its top tied to a cross-piece 6, carried by the tops of the two adjoining posts 1, by means of a spider 7. The casing 8 within the sides 2 has a bottom 9, while upon the said cross-pieces 6 upper stringers 10 are mounted, the said stringers 10 carrying an arc-shaped dome 11, provided with a central feed-opening 12, thus closing the plunger 8 on all sides, except at its ends. A driving-shaft 13 is carried by one of the end cross-pieces 4 and by intermediate cross-pieces $4^a$ and $4^b$, extending between the posts 1, the said shaft having upon its ends near the latter cross-piece a pinion 14 and having upon its projecting end a driving-wheel 15 or its equivalent for imparting motion to the shaft.

A transverse shaft 16 is mounted in bearings 17, secured to the stringers 3, and is located at a proper distance from the said pinion, the said transverse shaft having thereon, inside of the said stringers, oppositely-placed crown-geared wheels 18 $18^a$, either of which may be caused to be engaged by the pinion by a slight lateral motion of the latter, and it will be noticed that the effect of changing the engagement of the pinion from the one wheel to the other will be to reverse the motion of shaft 16, the direction of rotation of the shaft 13 being uniform. The shaft 16 has on each end a sprocket-wheel 19, while two suitable aligning pulleys 20 $20^a$ are placed on each side of the plunger-casing, we by preference mounting these pulleys on transverse bearings 21, extending through the stringers 3 from side to side of the press.

The plunger 22 is contained in a box 23, of a slightly-greater length, springs 24 being interposed between the ends of the plunger and the ends of the box, while a gong 25 is contained in each end of the latter, its spring-hammer 26 being adapted to be retracted by a projection 27 on the plunger, which on the continued forward movement of the plunger releases the hammer and sounds the gong. As the springs 24 are made of a strength sufficiently great to stand up against the pressure of the material while being compressed and to only give when the material has been compressed to the proper extent, it will be seen that the gong will not be sounded until the proper pressure has been applied, thus giving notice of that fact. The plunger and plunger-box are both contained in the casing 8, the plunger having an arm 28 projecting outwardly from each side thereof through a longitudinal slot 29 in the box 23 and another slot 30 in the sides 2 of the casing, upon the outside of which latter each arm is secured to the upper lead of the sprocket-chain 31, two of the said chains being used, they passing over the aligning pulleys 20 20$^a$ and sprocket-wheels 19 upon the opposite sides of the press.

Cross-pieces 32 extend across the interior of the casing 8, near the ends thereof, and above the path of the plunger-box, the said cross-pieces carrying the strips 33, which are concentric to the top of the dome 11, between which strips 33 and the top of the dome the striker 34 moves. This striker 34 is secured to the free end of an arm 35, the opposite end of the said arm being secured to the transverse shaft 36, supported in the stringers 10, one end of the said shaft having the pulley 36$^a$ mounted thereon, over which pulley 36$^a$ a belt 37 passes, the ends of the said belt being secured to the opposite ends of a lever 38, pivoted to the side 2 of the casing 8. A slotted link 39 is pivoted to the lower arm or end of the lever 38, while a headed stud 40, projecting from the arm 28 of the plunger, passes through the slot in the link, the stud being free to move for a considerable distance without imparting motion to the link. It will thus be seen that the to-and-fro movement of the plunger will move the striker up on its pivot and cause it to pass under the feed-opening in the dome, and to thus press the loose hay, &c., in front of the plunger, and it will also be noticed that the direction of motion of the said plunger and striker will always be opposite each other.

In order to effect an automatic reversal of the motion of the plunger at the proper time, we pivot on that side 2 of the casing 8 opposite the link 39 a rocking plate 41, having at each end thereof a spring-actuated catch 41$^a$, which is adapted to engage a post 41$^b$, secured to the side 2 of the casing, when that end of the plate is raised. We also secure to the upper face of the said plate a spring 42, having upwardly-bent ends, over which the antifriction-roller 28$^a$, secured to the lower surface of the arm 28 of the plunger, is adapted to pass, compressing the opposite ends of the springs alternately, the said arm 28 being adapted while pressing on one end of the spring, as stated, to strike the catch 41$^a$ at the corresponding end of the rocking plate, thus liberating that end of the plate, which will be pressed down by the compressed end of the spring, causing the catch 41$^a$ on the opposite end of the plate to engage the post and locking the rocking plate in that position until the return stroke of the plunger, when the opposite movement of the rocking plate will be produced. The downwardly-projecting arm 43 of the rocking plate is connected by means of the link 44 with one end of the crank-lever 45, the opposite end of which is pivoted to the cross-piece 4$^b$, which is laterally movable between the posts 1. As the cross-piece 4$^b$ carries that end of the driving-shaft upon which the pinion is mounted and as the said cross-piece will be so moved by the above-described connections as to cause the pinion to alternately engage the two gear-wheels 18 18$^a$, it will be seen that a continuous rotary motion of the driving-shaft will be automatically changed into a reversed rotation of the shaft 16 and a reciprocating motion of the plunger at the proper time, the said reciprocating motion of the plunger imparting the necessary reciprocating motion to the striker.

In order to permit the continuous actuation of the plunger and to obviate the necessity for stopping while securing the compressed hay, &c., into a bundle, the baling-compartments are made removable, so that upon compressing the proper quantity of hay in any one compartment the said compartment may be removed and an empty compartment substituted therefor opposite the end of the plunger-casing, the last-named chamber being filled while the bale within the first-named chamber is being wrapped. With this object in view a baling-box 46 is pivoted opposite the open ends of the plunger-casing 8, and as the said boxes on the opposite ends thereof are similar in all respects we shall describe but one of them, it being understood, however, that the same description may be applied to both. The baling-box 46 has side walls 47 and top and bottom walls 48, the ends of the said top and bottom walls being arc-shaped and struck from a center in the center of the box through a vertical aperture, at which point a pivot-bolt 49 passes, the said bolt also passing through the spider 7 and a cross-piece 50, secured to the stringers 3. The rounded ends of the box thus formed are opened; but the top and bottom walls 48 are of a sufficient length to pass close to the correspondingly-concaved faces of the end of the bottom 9 of the casing and the cross-piece 6 on the posts 1, thus making the baling-box a continuation of the plunger-casing when the former is in such a position on its pivot-bolt as to be in alignment with the latter. A transverse partition 51 extends across the middle of the box, dividing it into two opposite compartments, either of which may be caused to register with the end of the plunger-casing by rotating the box upon the bolt 49, the box being adapted to be locked in position by means of a spring-depressed pin 52, working in a suitable collar 53 in the spider, the said pin being adapted to enter either of the two recesses 54 in the top of the baling-box, one at each end, according to the position of the box. The opposite ends of the opposite side walls 48 of the baling chamber or box are cut away, and doors 55 are substituted therefor, the said doors being hinged at the top to the top of the baling-box and being adapted to swing upwardly thereon and to be locked down by means of the staple and hook 56. It will thus be seen that each compartment of the box has a door on one side thereof for the removal of the bale and for convenience in reaching the latter for wrapping it, while the side 48 of each compartment opposite the door is provided with a plurality of horizontal slots 57, through which and through a vertical slot 58 between the doors 55 and the corresponding sides 48 wires 59 pass, one end of each of the said wires passing around a drum 60, carried in brackets 61 on the side of each compartment, near the door thereof, the opposite ends of the wires being passed around an upright strap 62, holding the slotted ends of the sides 48 together.

In order to permit the ready removal of the completed bale, the bottom 49 of each compartment may be hinged at the slotted side wall thereof, and it will thus be seen that a side and the bottom of each compartment can be opened to remove the bale, the bottom being secured back in place and to the side door 55 by the above-mentioned staple and hook 56.

In order that the compressed hay, &c., may be under a proper pressure when wrapped with the wires 59, we mount a screw 63, provided with proper means of turning it, in the end post 5, the said screw having a head 64 upon its inner end, which head is adapted when pressed inwardly by the screw to maintain the hay, &c., already compressed by the plunger under a proper amount of compression.

Cross-bars 65 are mounted upon the top of the feeding-dome 11, one on each side of the feed-opening 12 therein, the said bars carrying on one end a suitable elevator 66 for the grain and on the other end a ribbed feed-roller 67, the shaft 68, upon which the roller 67 is mounted, and the shaft 69, upon which the roller 70 at the upper end of the elevator-apron 71 is mounted, projecting through bearings on one of the cross-bars and having upon their projecting ends the pulleys or sprocket-wheels $68^a$ and $69^a$, respectively. A driving-belt or sprocket-chain 72 is mounted on a pulley or sprocket-wheel 73 upon the main driving-shaft, and, passing over idlers 74, carried by a bracket on one of the posts 1, is brought up, its one lead passing over the pulley $69^a$ and its other over an idler 75, mounted in the cross-bar, the bight of the belt or chain passing around the pulley $68^a$, and it will thus be seen that on a rotation of the shaft 13 the elevator-apron 71 and the feed-roller 67 will be actuated in opposite directions, furnishing a steady stream of whatever substance is being baled for the action of the striker.

Such being the construction of our invention, the method of its use is as follows: Motion being imparted to the driving-shaft from any suitable source, the material to be compressed is placed upon the elevator-belt, and as the latter is actuated by the driving-shaft the material will be carried up to the feed-opening 12, through which it will be forced by the feed-roller 67 into the interior of the dome 11, where it will be acted on by the striker and the contiguous parts of the incoming stream of material be forced thereby in opposite directions down in front of the opposite ends of the plunger, by which the material will be forced in the compartments of the opposite baling-boxes. When the compartments of either or each of the opposite boxes are filled to the proper extent and the material therein is sufficiently compressed, the gong in the plunger-box will be rung, notifying the attendants of the fact. The locking-pin 52 is then disengaged from the proper baling-box and the latter is swung around until the empty compartment thereof will be opposite the open end of the plunger-casing and the filled compartment opposite the pressure-screw 63. This being done, the ends of the wires 59 are disengaged from the shaft 62 and are brought around the outer face of the bale and the end of each wire is caught around the body thereof upon the opposite side of the bale. The screw 63 is then rotated, compressing the bale, and the drum 60 is turned, tightening up the wires around the bale, after which the ends of the wire may be twisted up in the body thereof, which latter is then cut. The pivoted side and bottom of the compartment are then opened and the screw 63 retracted, when the completed bale is removed from the compartment, which is then again wired ready for the next bale. While the hay, &c., in one compartment of each box is being tied the opposite compartment is being filled, and upon the completion of the latter (which, as before, will actuate the gong) the compartment from which the bale has been drawn (the door and bottom thereof being first closed) will be swung opposite the open end of the plunger-casing and the above-described operation repeated until the desired amount of material has been baled. It will be noticed that by this construction the necessity for stopping the plunger is obviated and the latter, with the striker, may continue at work during the whole time of tying and removing the bundles.

In Fig. 9 is shown in dotted lines the position of the wires when the bale is being tied.

As the general construction of our press is adapted to compress cotton, in order to make it more effective for this purpose we place teeth 80 upon the outer edges of the striker, which are adapted to engage the fibers of the cotton. We also bevel the ends of the plunger-box 23, as at 81, and form shoulders 82 upon the inner surfaces of the side walls 47 of the baling-boxes, near the outer ends thereof, whereby the plunger will compress the cotton and force it behind the shoulders, thus preventing it from expanding again when the pressure is removed.

Having thus described our invention, what we claim is—

1. In a press, the combination, with a plunger and with a press-screw mounted in a suitable bearing, of a baling-box having oppositely-opening compartments pivoted between the screw and plunger, each of the said compartments having a slotted and a pivoted side, and a drum mounted on the said box near each of the said compartments, substantially as described.

2. In a press, the combination, with a plunger and a baling-box, of a driving-shaft having a pinion thereon, oppositely-disposed gear-wheels mounted upon a common shaft and driving a sprocket-wheel, a sprocket-chain passing over the said sprocket-wheel and attached to the plunger, and a rocking plate connected to the driving-shaft and adapted to alter the position of the said pinion and to be rocked by the said plunger, substantially as described.

3. In a press, the combination, with a plunger and a baling-box, the said plunger having an arm projecting therefrom, of two oppositely-placed gear-wheels mounted upon a common shaft, a sprocket-wheel mounted on the said shaft, and a sprocket-chain carried by the said sprocket-wheel and connected to the said arm of the plunger, a pivoted rocking lever having latches at its opposite ends and having springs projecting upwardly into the path of the plunger-arm, a link connecting the pinion and rocking lever, and fixed projections which the said latches engage and from which they are adapted to be disengaged by contact with the said arm, substantially as described.

4. In a press, the combination, with a plunger and a baling-box, the said plunger having an arm projecting therefrom, of two oppositely-placed gear-wheels mounted upon a common shaft, a sprocket-wheel carried by the said shaft, a chain passing over the said sprocket-wheel and connected to the said plunger-arm, a pivoted rocking lever having springs at its ends projecting into the path of the plunger-arm, whereby the said lever will be rocked, and a driven pinion adapted to engage either of the said gear-wheels and connected to the said rocking lever, substantially as described.

5. In a hay-press, the combination, with a feeding-dome, of a double-headed plunger reciprocating below the said dome and a striker centrally pivoted and rotated within the said dome by the motion of the said plunger, the direction of the motion of the two parts being opposite to each other, substantially as described.

6. In a hay-press, the combination, with a feeding-dome, of a double-headed plunger having an arm projecting therefrom provided with a stud, a transverse shaft passing through the said dome and carrying a striker therein and having a drum upon its end, a belt passing over the said drum, a pivoted lever having its opposite ends attached to the opposite ends of the said belt, and a link secured to one end of the said lever and being engaged by the stud upon the plunger-arm, substantially as described.

7. A pivoted baling-box having its opposite ends open and having its interior divided into two compartments by a transverse partition, the opposite ends of the opposite sides and both ends of the bottom of the said box being hinged, substantially as described.

8. A pivoted baling-box having its opposite ends open and having its interior divided into two compartments by a transverse partition, the opposite ends of the opposite sides and both ends of the bottom of the box being hinged, the pivoted portions forming the sides and bottom of each compartment being secured closed by a single common fastening opposite to their hinged sides, substantially as described.

9. The combination, with a baling-box having slotted sides, of a windlass upon one side thereof, and an upright rod joining the fingers formed in the opposite side by the said slots, and wires bent around the said rod and secured to the said windlass and passing through the said slots, substantially as described.

10. The combination, with a baling-box having a door upon one of its sides and a slot in the other, of a windlass upon the same side of the box as the said door, a vertical rod joining the fingers of the opposite side, formed by the said slots, and wires bent around the said rod and secured to the windlass and passing through the said slots and between the door and the contiguous side of the compartment, substantially as described.

In testimony whereof we affix our signatures in presence of two witnesses.

JOHN THOMAS RUSSELL.
JEFFERSON DAVIS WILLIAMS.

Witnesses:
F. M. POLLOCK,
J. S. PATTERSON.